United States Patent
Shrestha et al.

(10) Patent No.: US 12,266,996 B2
(45) Date of Patent: Apr. 1, 2025

(54) LIQUID COOLED MOTORS USING HYDRAULIC EXPANSION TUBES WITH CORRUGATED CONTACT

(71) Applicant: ABB Schweiz AG, Baden (CH)

(72) Inventors: Ghanshyam Shrestha, Raleigh, NC (US); Wei Xing, Raleigh, NC (US); Graham Medlin, Raleigh, NC (US); Rajib Mikail, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 378 days.

(21) Appl. No.: 17/559,894

(22) Filed: Dec. 22, 2021

(65) Prior Publication Data
US 2023/0208255 A1 Jun. 29, 2023

(51) Int. Cl.
H02K 9/197 (2006.01)
H02K 1/20 (2006.01)
H02K 9/19 (2006.01)

(52) U.S. Cl.
CPC .............. H02K 9/197 (2013.01); H02K 1/20 (2013.01); H02K 9/19 (2013.01)

(58) Field of Classification Search
CPC ............ H02K 1/20; H02K 9/00; H02K 9/197; H02K 5/203; H02K 15/00; H02K 9/19; H02K 9/02; H02K 9/04; H02K 9/06; H02K 9/08; H02K 9/10; H02K 9/12; H02K 9/14; H02K 9/16; H02K 9/18; H02K 5/20; H05K 7/20
USPC .... 310/216.016, 216.017, 216.018, 216.119, 310/52, 54, 55, 57, 58, 59, 60 R, 62, 63, 310/60 A, 64
See application file for complete search history.

(56) References Cited

U.S. PATENT DOCUMENTS

| | | | |
|---|---|---|---|
| 7,800,272 B2 * | 9/2010 | Nakayama et al. . | H02K 1/2766 310/156.56 |
| 8,072,100 B2 | 12/2011 | Monzel | |
| 2010/0102649 A1 | 4/2010 | Cherney et al. | |
| 2012/0112572 A1* | 5/2012 | Le Besnerais ........... | H02K 5/20 310/58 |
| 2014/0139058 A1* | 5/2014 | Wei ........................ | H02K 5/203 310/59 |
| 2021/0075274 A1* | 3/2021 | Druant ................. | H02K 15/024 |
| 2022/0320933 A1* | 10/2022 | El-Refaie ................ | H02K 3/22 |

FOREIGN PATENT DOCUMENTS

WO   WO 2019023336 A1 *  1/2019  .............. H02K 1/20

* cited by examiner

*Primary Examiner* — Alexander A Singh
(74) *Attorney, Agent, or Firm* — Greenberg Traurig, LLP

(57) ABSTRACT

The present disclosure relates to electrical machines, such as liquid-cooled motors. The liquid-cooled motors can include a stator with cooling tube channels (e.g., corrugated channels) having tubes inserted and expanded. Lamination holes for each lamination in the lamination stack of the stator can have varying diameter along the axial direction to achieve a corrugated internal feature. The tubes for cooling liquid can be fitted in the lamination holes of the stator. In some embodiments, hydraulic expansion expands and plastically deforms the tubes to the contour of the corrugated internal feature of the corrugated channel. In some embodiments, the tube can also be inserted in the corrugated channel and a stator head plate, thereby helping create a compact stator by removing the need for tube connections to connect the corrugated channels.

17 Claims, 6 Drawing Sheets

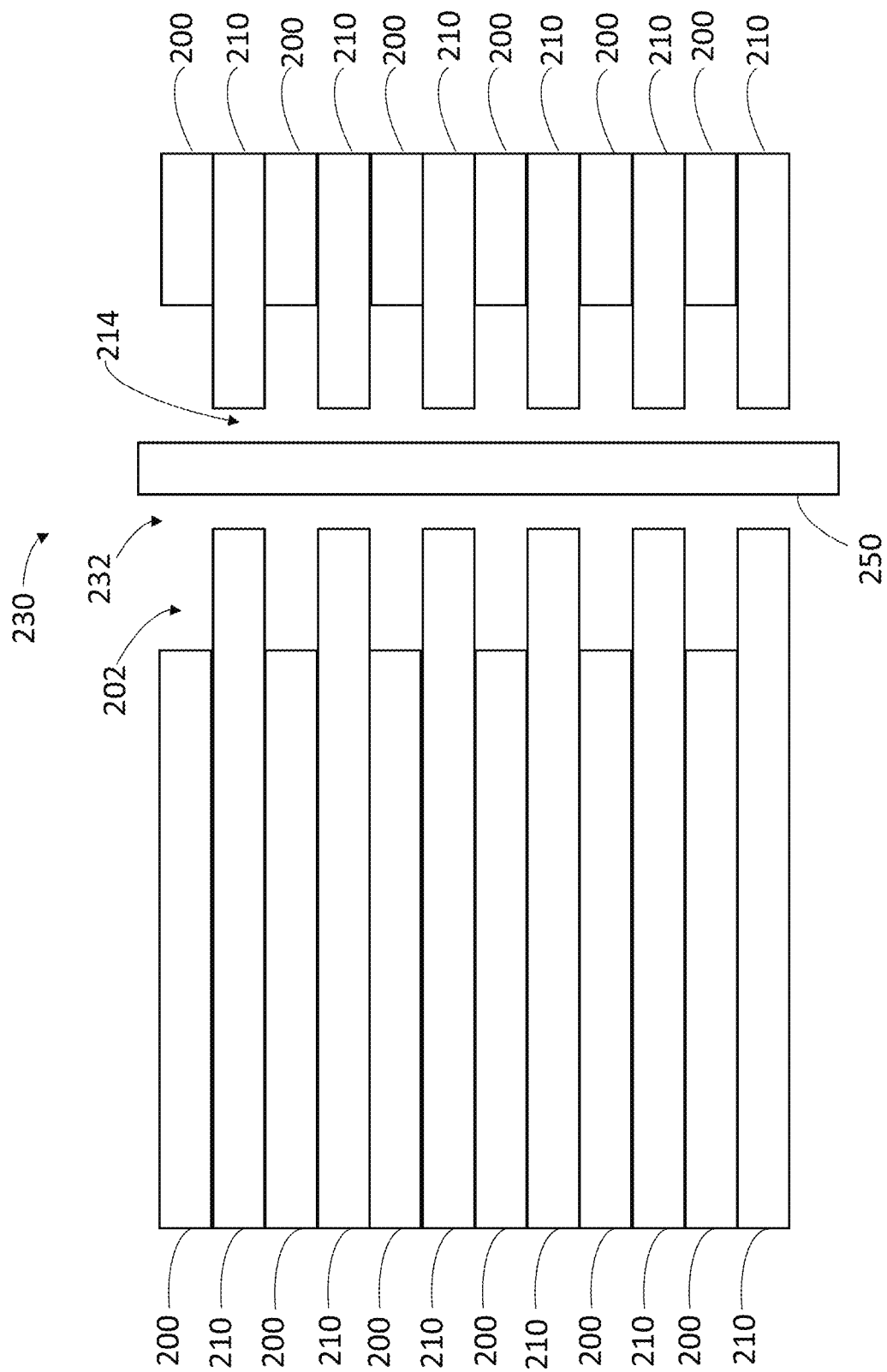

LIQUID COOLED MOTORS USING HYDRAULIC EXPANSION TUBES WITH CORRUGATED CONTACT

FIELD

The present disclosure relates to the field of electrical machines. More specifically, the present disclosure relates to a system for cooling electrical machines.

BACKGROUND

Electrical machines can include moving parts, such as a rotor. The electrical machine can generate heat. The electrical machine may need to be cooled.

SUMMARY

The present disclosure relates to electrical machines, such as liquid-cooled motors. The liquid-cooled motors can include an industrial motor cooling system based on a set of cooling tube channels (e.g., corrugated channels) having tubes inserted and expanded in the back-iron region of a motor. Lamination holes for each lamination in a lamination stack of the liquid-cooled motor can have varying diameter along the axial direction to achieve a corrugated internal feature. The tubes for cooling liquid can be fitted in the lamination holes of the stator. In some examples, hydraulic expansion expands the tubes to fit the corrugated internal feature of the corrugated channel. In some embodiments, the tube can also be inserted in the corrugated channel and a stator head plate, thereby helping create a compact stator by removing the need for tube connections to connect the corrugated channels. In some embodiments, with a corrugated channel and an expanded tube, the present disclosure can increase cooling and mechanical rigidity of the stator. The present disclosure can achieve high power density, high efficiency, and compactness.

Some embodiments of the present disclosure relate to a stator including a lamination stack, wherein the lamination stack includes a plurality of laminations stacked upon each other, wherein each lamination of the plurality of laminations includes: a first lamination hole with a first cross-sectional geometry, and a second lamination hole with a second cross-sectional geometry, wherein the first cross-sectional geometry differs from the second cross-sectional geometry, and wherein a corrugated channel of the lamination stack has varying internal diameter, the corrugated channel formed by the first lamination hole of a first lamination being axially aligned over the second lamination hole of a second lamination forming the corrugated channel.

In some embodiments, the corrugated channel has a varying diameter along an axial direction of the stator, thereby forming a corrugated internal feature of the corrugated channel.

In some embodiments, the corrugated internal feature increases a surface area of the corrugated channel for heat dissipation and increases turbulent flow for fluid flowing through the corrugated channel.

In some embodiments, each lamination of the plurality of laminations includes at least the first lamination hole, the second lamination hole, and a third lamination hole with a third cross-sectional geometry, and wherein a cross-sectional diameter of the first lamination hole, the second lamination hole, and the third lamination hole differ from each other.

In some embodiments, the first lamination hole of a first lamination, the second lamination hole of a second lamination, and the third lamination hole of a third lamination are axially aligned with each other.

In some embodiments, the lamination stack is adjacent to a stator end plate.

In some embodiments, the stator end plate includes a corrugated channel that is directly connected to the corrugated channel of the lamination stack.

In some embodiments, a tube is inserted into the corrugated channel of the lamination stack.

In some embodiments, the tube includes a coating on an exterior of the tube.

In some embodiments, an end connection of the tube is integrated into a stator end plate.

Some embodiments of the present disclosure relate to a method of manufacturing a stator including: stacking a plurality of laminations to form a lamination stack, wherein each lamination of the plurality of laminations includes: a first lamination hole with a first cross-sectional geometry, and a second lamination hole with a second cross-sectional geometry, wherein the first cross-sectional geometry differs from the second cross-sectional geometry, and wherein stacking the plurality of laminations includes axially aligning the first lamination hole of a first lamination with the second lamination hole in alternating fashion, thereby forming a corrugated channel of the lamination stack with varying internal diameter.

In some embodiments, each lamination further includes a third lamination hole with a third cross-sectional geometry, and wherein the first cross-sectional geometry, the second cross-sectional geometry, and the third cross-sectional geometry differ from each other.

In some embodiments, the first lamination hole of a first lamination, the second lamination hole of a second lamination, and the third lamination hole of a third lamination are axially aligned with each other.

Some embodiments of the present disclosure relate to a method of cooling a stator, including: stacking a plurality of laminations in an alternating fashion, thereby forming a lamination stack, wherein each lamination of the lamination stack includes: a first lamination hole with a first cross-sectional geometry, and a second lamination hole with a second cross-sectional geometry, wherein the first cross-sectional geometry differs from the second cross-sectional geometry, and wherein stacking the plurality of laminations in the alternating fashion, includes axially aligning the first lamination hole of a first lamination over the second lamination hole of a second lamination, thereby forming a corrugated channel of the lamination stack; inserting a tube into the corrugated channel; pressurizing an interior of the tube to deform the tube to contact the corrugated channel, thereby creating a corrugated form of the tube; and flowing a fluid through a cooling tube, thereby cooling the stator.

In some embodiments, wherein pressurizing the interior of the tube includes hydraulically expanding the tube.

In some embodiments, flowing the fluid includes non-laminar flow.

In some embodiments, deforming the tube includes plastically deforming the tube against the corrugated channel.

In some embodiments, deforming the tube closes any gaps between an outer wall of the tube and the corrugated channel.

In some embodiments, the method includes inserting the tube through the corrugated channel and into a stator end plate.

In some embodiments, the corrugated form of the tube mechanically anchors the cooling tube to the lamination stack, thereby reducing or removing a need for additional anchor methods.

In some embodiments, deforming the tube includes deforming the tube inside of a channel of the stator end plate.

In some embodiments, the method includes heating or cooling the stator before inserting the tube into the corrugated channel.

In some embodiments, the method includes heating or cooling the tube before inserting the tube into the corrugated channel.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 2D is a cross-sectional view of a corrugated channel along lines 2D of FIG. 2C, in accordance with some embodiments.

DETAILED DESCRIPTION

The present disclosure relates to liquid cooling of an electrical machine, e.g., a liquid-cooled motor with a stator. Tubes can be inserted into the stator back iron a liquid-cooled motor. The fluid, such as a cooling liquid, can flow in the vicinity of the conductors (e.g., copper conductors) to cool down the electrical machine effectively. The cooling liquid can be a coolant. A tube expansion process can deform (e.g., plastically deform) the tube and closes any gaps between an outer wall of the tube and a corrugated channel formed by laminations holes axially aligned. The deformation (e.g., plastic deformation) of the tube to the corrugated channel ensures thermal contact conductance between the tube and the corrugated channel. By varying the dimensions of the lamination hole, the dimensions of the corrugated channel are varied (e.g., an internal diameter of the corrugated channel), forming an internal corrugated feature. The internal corrugated feature of the corrugated channel increases cooling performance by increasing a surface area of the corrugated channel and/or increasing turbulent flow through the corrugated channel. In some embodiments, the tubes are also inserted into and expanded into the stator end plate, thereby serving as a header of the liquid flow path and eliminating the need for tube connectors. This helps ensure contact and sturdy integration of the tubes with the lamination stack, including the corrugated channel of the lamination stack. Laminations and their respective headers may sometimes require attachment mechanisms, such as threaded rods, glue, welds, and/or cleats. By deforming, the tube occupies the contour of the corrugated channel of the lamination stack and can serve as a mechanical anchor point, thereby reducing or removing the need for other attachment mechanisms. By reducing the number of required parts, the present disclosure can help ensure a simplified assembly and apparatus.

Figure 1B:
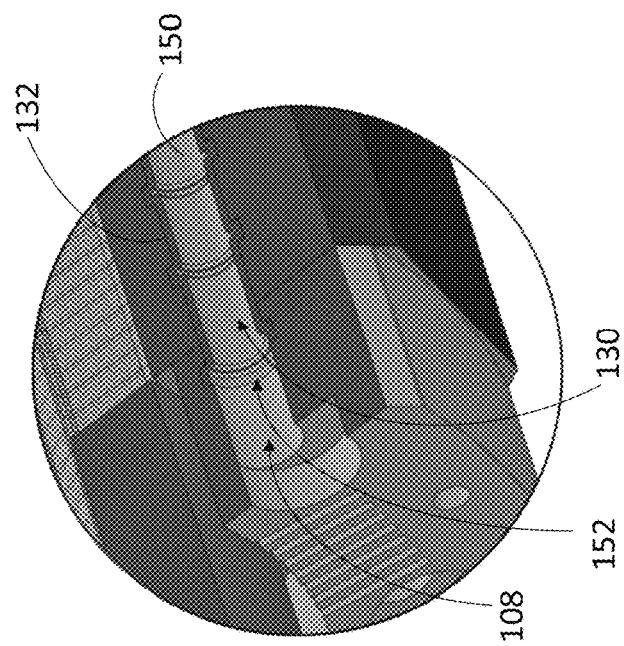
FIG. 1B is a zoomed-in view of a portion of the electrical machine depicted in FIG. 1A.
Figure 1A:
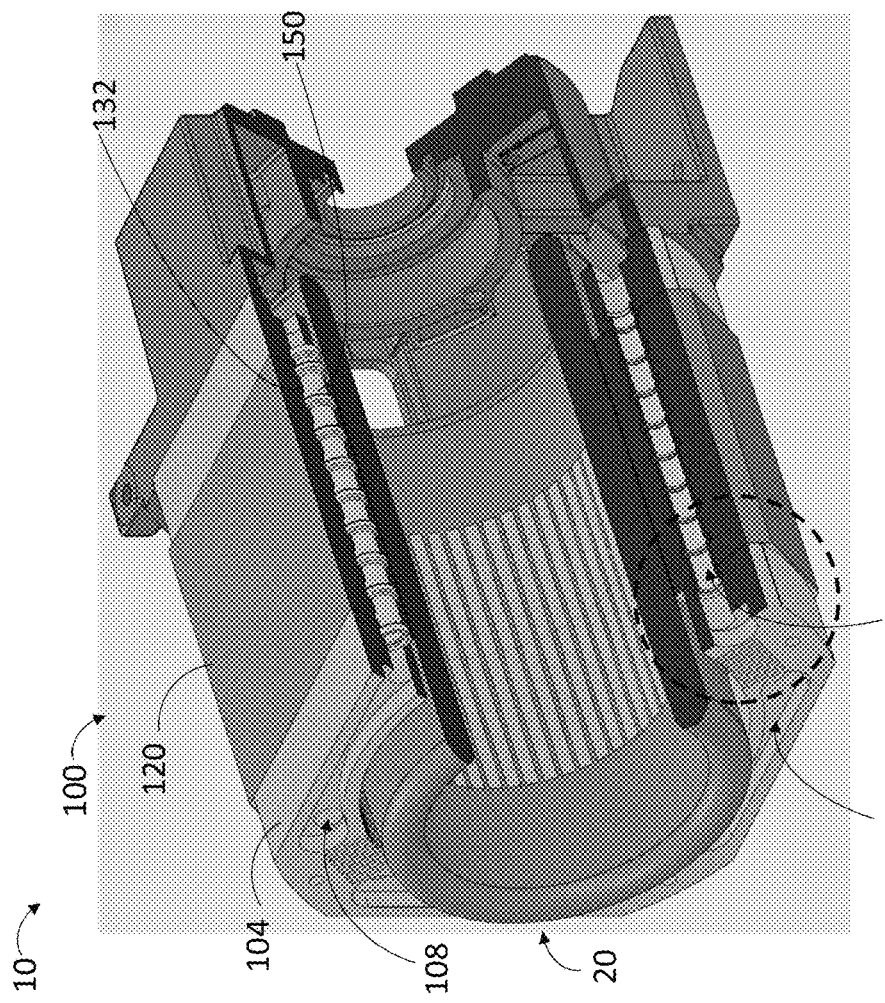
FIG. 1A is a perspective view of a non-limiting embodiment of the electrical machine described herein.

FIG. 1A is a perspective view of a non-limiting embodiment of an electrical machine 10 described herein. FIG. 1B is a zoomed-in view of a portion of the electrical machine 10 depicted in FIG. 1A. In some embodiments, the electrical machine 10 is a liquid-cooled motor. The electrical machine 10 includes a rotor 20 and a stator 100. The stator 100 includes a lamination stack 120 and a stator end plate 104. The lamination stack 120 is adjacent to the stator end plate 104. The stator end plate 104 can include a channel 106 and a channel opening 108. The lamination stack 120 includes a corrugated channel 130 with a corrugated internal feature 132. In some embodiments, the channel 106 of the stator end plate 104 is directly connected to the corrugated channel 130. In some embodiments, the channel 106 of the stator end plate 104 is a corrugated channel. For example, the channel 106 of the stator end plate 104 can be a corrugated channel that is directly connected to the corrugated channel 130 of the lamination stack 120.

The lamination holes defining the corrugated channel 130 can be made of many different sizes (see for example the lamination holes in FIG. 2A and FIG. 2B) creating one or more corrugated channel 130. Stacking the laminations of the lamination stack 120 in an alternating fashion will form the corrugated internal feature 132 for the tube 150 to deform into.

A tube 150 can be inserted in the corrugated channel 130. In some embodiments, the tube 150 can extend through the corrugated channel 130 and into the stator end plate 104, including the channel 106 of the stator end plate 104. Once the tube 150 is inserted into the corrugated channel 130, the tube 150 can be deformed against the corrugated internal feature 132 of the corrugated channel 130.

In some embodiments, deforming the tube 150 includes applying a pressure at an inside of the tube 150 to deform the tube 150 and contour the tube 150 to the corrugated internal feature 132 of the corrugated channel 130. In some embodiments, deforming the tube 150 includes pressurizing the interior of the tube 150. In some embodiments, pressurizing the interior of the tube 150 includes hydraulically expanding the tube 150. In some embodiments, deforming the tube 150 closes any gaps between an outer wall of the tube 150 and the corrugated channel 130. In some embodiments, deforming the tube 150 can include deforming the tube 150 inside the channel 106 of the stator end plate 104. In some embodiments, deforming the tube 150 includes plastically deforming the tube 150.

Once the tube 150 is inserted into the corrugated channel 130, pressure can be applied at an inside of the tube 150 to deform the tube 150 and contour the tube 150 to the corrugated internal feature 132 of the corrugated channel 130. The temperature during the expansion process of the tube 150 can be determined based on the operating conditions of the electrical machine 10. The temperature for expansion can be a midpoint of the operating temperature range for the electrical machine 10. For example, if the electrical machine 10 is operated between a temperature of approximately −40 degrees Celsius and 100 degrees Celsius, the temperature during the expansion process will be 40 degrees Celsius. In addition, the stator 100 can be heated and/or cooled before the tube 150 is inserted into the corrugated channel 130.

In some embodiments, the method includes heating or cooling the tube 150 before inserting into the corrugated channel 130. In some embodiments, the material of the tube 150 can be selected to have similar or substantially similar (e.g., the same) thermal characteristic as the material of the lamination stack 120 (e.g., the first lamination 200 and/or the second lamination 210). In some embodiments, the coefficient of thermal expansion of the tube 150 can be similar or substantially similar (e.g., the same) to the coefficient of thermal expansion of the as the material of the lamination stack 120 (e.g., the first lamination 200 and/or the second lamination 210)

The locations of the tube 150 are symmetrical with relation to other portions of the electrical machine 10. For example, in some embodiments, the locations of the tube 150 can be symmetrical with relation to the pole counts of the electrical machine 10. The number of tubes 150 can be proportional to the motor pole count of the electrical machine 10. Additionally, the locations of the tube 150 can be modified to minimize the impact on electromagnetic performance of the electrical machine 10.

In some embodiments, the tube 150 includes a coating on an exterior of the tube 150. For example, a surface of the tube 150 can be partially or fully covered with a thermally effective coating to ensure effective thermal contact with the corrugated internal feature 132 of the corrugated channel 130. A coating can also be used to reduce an air gap between the tube 150 and the corrugated channel 130. The coatings can in varying forms. In some embodiments, the coating can be powder or paste form with increased thermally conductivity. The coating can be applied to the tube 150 by various methods. In some embodiments, the coating can be sprayed on the tube 150 or on the corrugated channel 130 before inserting the tube 150. In some embodiments, the tube 150 can have internal features to help ensure the tube 150 does not move during the life of operation of the electrical machine 10. The internal features of the tube 150 can vary, including any geometric shape. The geometry of the internal feature of the tube 150 do not have to be round. For examples, the geometry of the internal feature of the tube 150 can be, but not limited to, oval, square, diamond, heart, pear and oblong. In some embodiments, the tube 150 can have varying thickness and/or a corrugated internal feature.

In some embodiments, the stator end plate 104 is configured so that the tube 150 will deform inside the channel 106. In some embodiments, the tube 150 includes an end connection 152. In some embodiments, the end connection 152 can be made using a corrugated tube. The end connection 152 of the tube 150 may be integrated into the stator end plate 104. In some embodiments, the stator end plate 104 is designed so that a fluid (e.g., a coolant) can flow between an array of tubes 150. That is, there can be more than one corrugated channel 130 with the tube 150 inserted. There may be several corrugated channels 130, each with a respective tube 150 inserted. The channel 106 of the stator end plate 104 allows coolant to flow between the more than one tube 150. With the channel 106 connecting the coolant to different tubes 150, there is not a need for a tube connector to be attached to the lamination stack 120.

The corrugated internal feature 132 of the corrugated channel 130 and the tube 150 being contoured to the corrugated internal feature 132 acts as a clamp to constrain the relative motion between the laminations of the lamination stack 120 and the stator end plate 104. That is, with the tube 150 assuming the form of the corrugated internal feature 132, the tube 150 mechanically anchors to the lamination stack 120, thereby reducing or removing a need for additional anchor methods. For example, the number of axial threaded rods holding the lamination stack 120 together can be reduced or eliminated. The channel 106 of the stator end plate 104 also helps eliminate the need for other fixation methods between the lamination stack 120 and the stator end plate 104. For example, the design of the present disclosure eliminates the need for additional holes in the laminations of the lamination stack 120 for bolts, rivets, or welds.

By reducing the need for additional parts (e.g., mechanical fixation methods like bolts, rivets, or welds), the electrical machine 10 of the present disclosure can have a compact form and mechanical integration.

The stator end plate 104 serves as a header for a liquid cooling circuit of the electrical machine 10. The stator end plate 104 connects multiple tubes together (e.g., the tube 150 in the corrugated channel 130; FIG. 1A displays four of the corrugated channels 130 with the tubes 150) and eliminates the need for tube fittings and/or adapters. The reduction in needed parts for the electrical machine 10 can result in an easier assembly process. The stator end plate 104 can be modified to reduce loss of pressure of fluid flowing through the corrugated channel 130 and the stator end plate 104. Similarly, the geometry of the corrugated internal feature 132 can be modified to increase cooling and/or lower pump power consumption for the electrical machine 10. The corrugated internal feature 132 can modify flow characteristics of the fluid moving through the tube 150 or the corrugated channel 130. In some embodiments, the corrugated internal feature 132 creates non-laminar flow for the fluid. In some embodiments, by modifying the corrugated internal feature 132, the surface area of the corrugated internal feature 132 can be increased and/or turbulent flow of the fluid can be increased. Consequently, modifying the corrugated internal feature 132 can increase a cooling rate of the stator 100 via heat dissipation through the corrugated channel 130.

The features of the present disclosure provide for compactness and power density of the electrical machine 10. The amount of power that can be drawn from the electrical machine 10 is increased due to the increased cooling of the stator 100, including the lamination stack 120 and/or the stator end plate 104. The size and weight of the electrical machine 10 can be reduced due to less needed parts and the absence of a blower. The present disclosure also saves cost due to saving the cost of fabricating a water jacket. The reduction in costs is aided by, at least part, the reduction of number of parts and the reduction in the steps of assembly for the electrical machine 10.

Figure 2B:
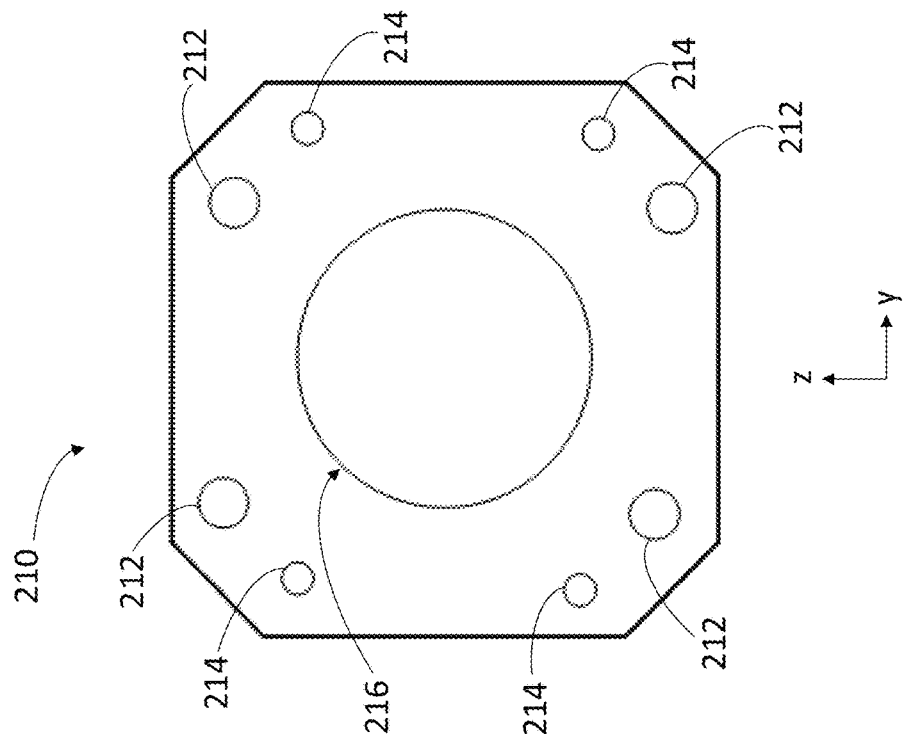
FIG. 2B is top-down view of a second lamination, in accordance with some embodiments.
Figure 2A:
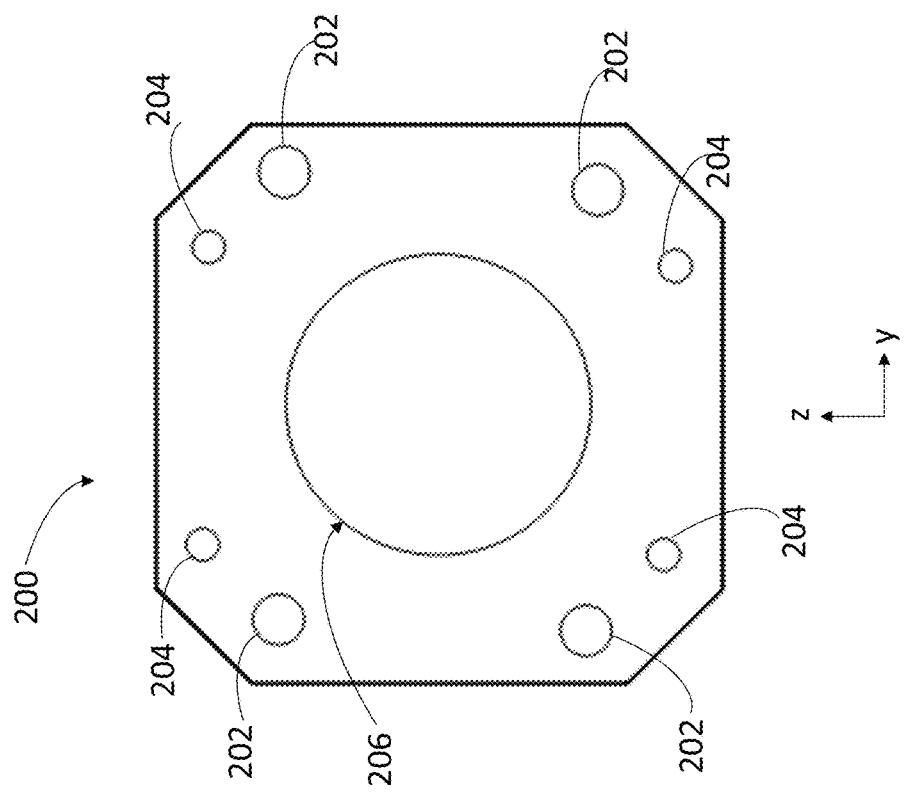
FIG. 2A is top-down view of a first lamination, in accordance with some embodiments.

FIG. 2A is top-down view of a first lamination 200, in accordance with some embodiments. FIG. 2B is top-down view of a second lamination 210, in accordance with some embodiments. In some embodiments, the first lamination 200 is the same as the second lamination 210, the only difference being that the second lamination 210 is rotated 90 degrees in comparison to the first lamination 200. The lamination stack 120 includes a plurality of laminations (e.g., the first lamination 200 and the second lamination 210) stacked upon each other. In some embodiments, the lamination stack 120 includes at least two laminations (e.g., the first lamination 200 and the second lamination 210).

The first lamination 200 and the second lamination 210 will be described together. The first lamination 200 and the second lamination 210 include an inner periphery 206 and an inner periphery 216, respectively. The first lamination 200 and the second lamination 210 include a first lamination hole 202, 212 and a second lamination hole 204, 214. The first lamination hole 202, 212 can differ from or be the same as the second lamination hole 204, 214, including by shape, geometry, and/or size. For example, the geometry and shape can be symmetrical or non-symmetrical. Symmetrical shapes include, but not are limited to, oval, round, square, diamond, heart, pear and oblong. The first lamination hole 202, 212 and a second lamination hole 204, 214 can also have portions with different shapes, geometries, and sizes. For example, one half of the shape can be circular, and the other half of the shape can be square. In some embodiments, the first lamination hole 202, 212 has a first cross-sectional geometry that differs the second lamination hole 204, 214 with a second cross-sectional geometry. In some embodiments, the first cross-sectional geometry differs from the second cross-sectional in size and/or shape. For example, the diameter of the first cross-sectional geometry can differ (e.g., be larger or smaller) from the diameter of the second cross-sectional geometry. In some embodiments, the first cross-sectional geometry and the second cross-sectional geometry are similar or substantially similar (e.g., the same). In some embodiments, the first cross-sectional geometry and the second cross-sectional geometry are different (e.g., one is square and the other circular, one is large and one is small, and/or one is symmetrical and one is non-symmetrical).

Although the first lamination 200 and the second lamination 210 are shown with two different lamination holes (i.e., the first lamination hole 202, 212 and the second lamination hole 204, 214), the first lamination 200 and the second lamination 210 can include more than two different lamination holes. In some embodiments, there can be three different lamination holes.

Figure 2C:
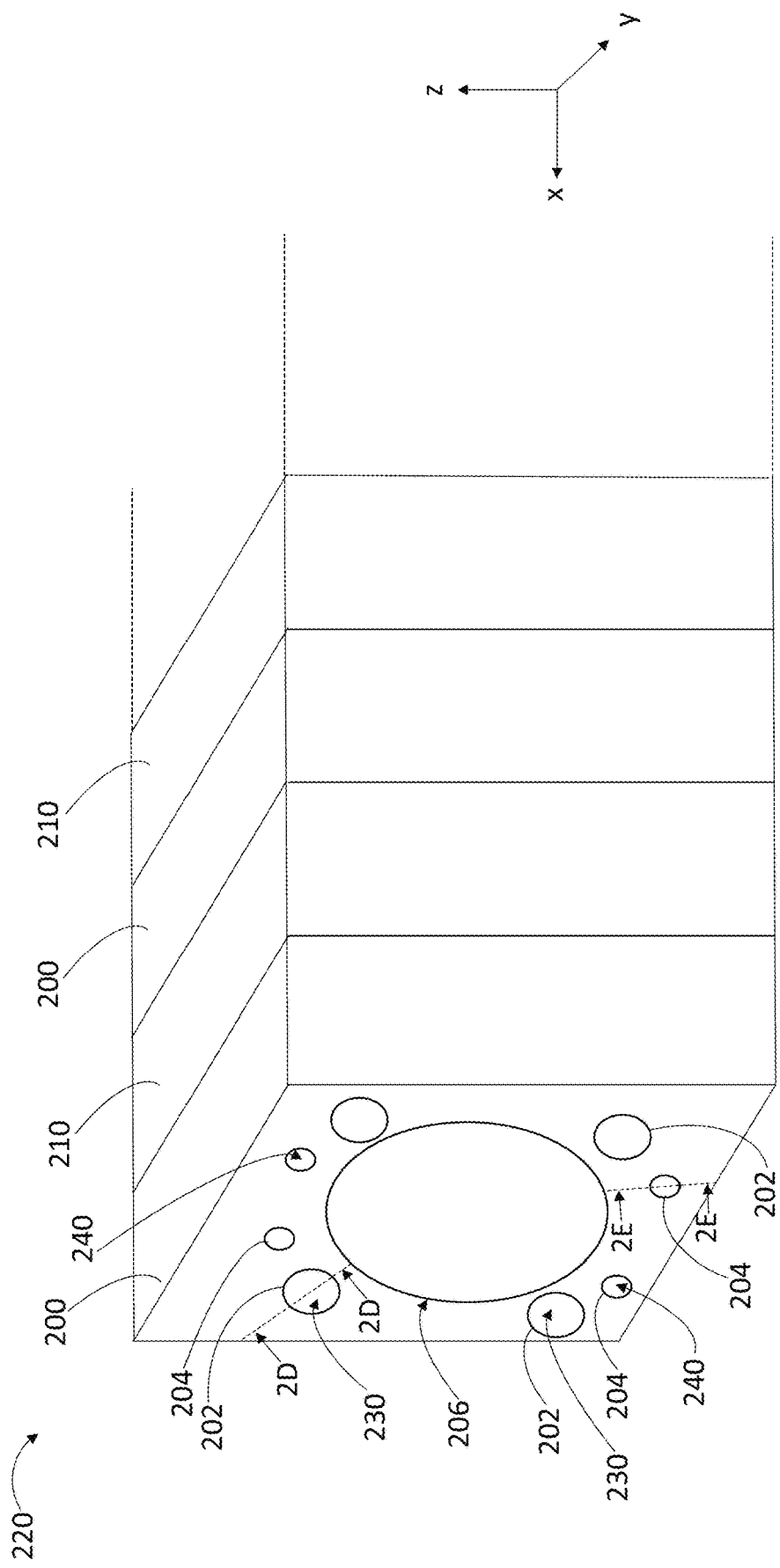
FIG. 2C is a perspective view of a lamination stack, in accordance with some embodiments.

FIG. 2C is a perspective view of a lamination stack 220, in accordance with some embodiments. The lamination stack 220 includes the first lamination 200 and the second lamination 210 stacked in an alternating fashion. The lamination stack 220 includes a first corrugated channel 230 and a second corrugated channel 240. The first corrugated channel 230 is formed by the first lamination hole 202 of the first lamination 200 being axially aligned over the second lamination hole 214 of the second lamination 210. In FIG. 2C, there are four of the first corrugated channels 230 and four of the second corrugated channels 240. Although FIG. 2C shows two corrugated channels (the first corrugated channel 230 and the second corrugated channel 240), in some embodiments, there can be varying number of corrugated channels, including one corrugated channel or three corrugated channels.

FIG. 2D is a cross-sectional view of the first corrugated channel 230 along lines 2D of FIG. 2C, in accordance with some embodiments. As shown in FIG. 2D, the first corrugated channel 230 of the lamination stack 220 has varying internal diameter due to the alternating fashion of the first lamination 200 and the second lamination 210. The varying diameter of the first corrugated channel 230 along an axial direction of the lamination stack 220 (e.g., a lamination stack for a stator such as the stator 100) forms a corrugated internal feature 232 of the first corrugated channel 230. The corrugated internal feature 232 of the first corrugated channel 230 increases a surface area of the first corrugated channel 230 for heat dissipation and increases turbulent flow for fluid flowing through the first corrugated channel 230. For example, the corrugated internal feature 232 can increase a surface area by varying the lamination hole diameter (e.g., the first lamination hole 202 and the second lamination hole 204) along the axial length to realize the corrugated channel 232 for heat dissipation and increase turbulent flow for fluid flowing through the corrugated channel (e.g., the first corrugated channel 230 and/or the corrugated internal feature 232).

Figure 2E:
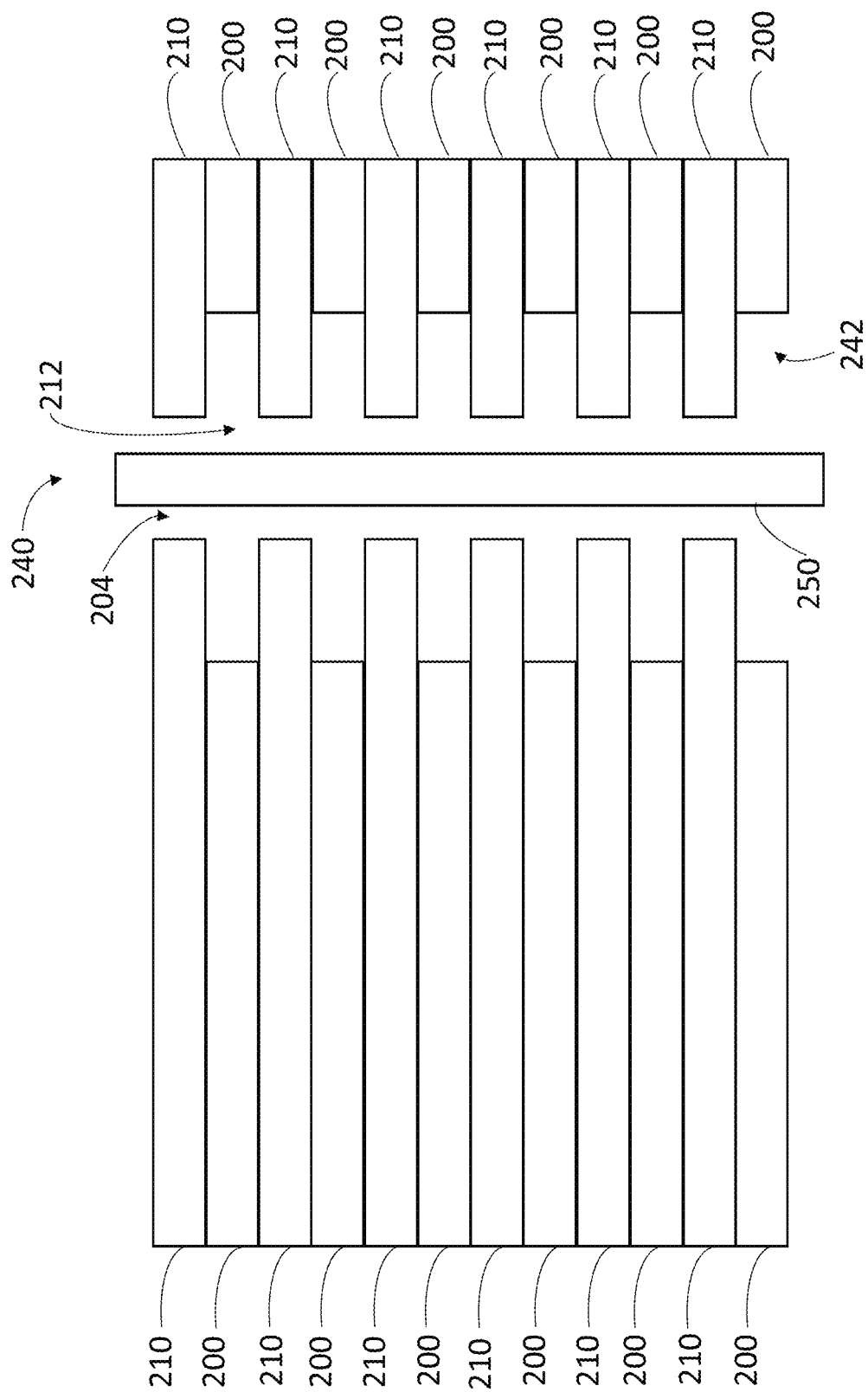
FIG. 2E is a cross-sectional view of a corrugated channel along lines 2E of FIG. 2C, in accordance with some embodiments.

The second corrugated channel 240 is formed by the second lamination hole 204 of the first lamination 200 being axially aligned over the first lamination hole 212 of the second lamination 210. FIG. 2E is a cross-sectional view of the second corrugated channel 240 along lines 2E of FIG. 2C, in accordance with some embodiments. As shown in FIG. 2E, the second corrugated channel 240 of the lamination stack 220 has varying internal diameter due to the alternating fashion of the first lamination 200 and the second lamination 210. The varying diameter of the second corrugated channel 240 along an axial direction of the lamination stack 220 (e.g., a lamination stack for a stator such as the stator 100) forms a corrugated internal feature 242 of the second corrugated channel 240. The corrugated internal feature 242 of the second corrugated channel 240 increases a surface area of the second corrugated channel 240 for heat dissipation and increases turbulent flow for fluid flowing through the second corrugated channel 240.

The coefficient of thermal expansion for the tube 250 and the coefficient of thermal expansion for the lamination stack 120 (including the first lamination 200 and/or the second lamination 210) can be similar or substantially similar (e.g., the same). For example, during operation of the electrical machine 10 (including thermal cycles), the force due to unequal expansion of the tube 250 and the lamination stack 120 (including the first lamination 200 and/or the second lamination 210) can be within the tolerance of the yield strength or within the elastically deformation range for the specific material used for the electrical machine 10, including the tube 250 and/or the lamination stack 120. As a result of the material having similar or substantially similar (e.g., the same) used for the electrical machine 10, including the tube 250 and the lamination stack 120 (including the first lamination 200 and/or the second lamination 210), the material for the electrical machine 10 can be sustained for the lifetime of the intended application.

A method of manufacturing includes stacking a plurality of laminations (e.g., the first lamination 200 and the second lamination 210) to form a lamination stack (e.g., the lamination stack 220). The first lamination 200 and the second lamination 210 can be the same lamination but rotated 90 degrees in reference to one another in the lamination stack, such as the lamination stack 220. In some embodiments, each lamination can further include a third lamination hole with a third cross-sectional geometry. The third cross-sectional geometry can differ from the cross-sectional geometries of a first and second lamination hole (e.g., the first lamination hole 202 and the second lamination hole 204). In some embodiments, a cross-sectional diameter of the first lamination hole, the second lamination hole, and the third lamination hole differ from each other. Similar to the lamination stack 220 of FIG. 2C, the third lamination can be a third lamination added between the other laminations (e.g., after the first lamination 200 and the second lamination 210), thereby the first lamination hole 202 of the first lamination 200, the second lamination hole 214 of the second lamination 210, and the third lamination hole of a third lamination are axially aligned with each other.

FIG. 2C shows the lamination stack 220 stacked in alternating fashion. That is, the first lamination 200 and the second lamination 210 are stacked alternating every other one. In some embodiments, the lamination stack 220 can have the laminations stacked in a different order. For example, the lamination stack 220 can include two of the first lamination 200 adjacent to one another and two of the second lamination 210 adjacent to one another, in an alternating fashion. In another example, the lamination stack 220 can include one of the first lamination 200 and two of the second lamination 210 adjacent to each other, in an alternating fashion. The arrangement of the lamination stack 220 can also be altered. That is, a top portion of the lamination stack 220 can have one repeating pattern and the bottom portion of the lamination stack 220 can have a different repeating pattern of the laminations.

The outer periphery of the lamination stack 220 can be various geometries with a plurality of different lamination holes. For example, the outer periphery of the lamination stack 220 can be, but not limited to, oval, round, square, diamond, heart, pear and oblong. The geometry of the outer periphery of the lamination stack 220 can have varying number of sides (e.g., at least two sides, three sides, four sides (as shown FIG. 2C), etc.). With two lamination holes (the first lamination hole 202/212 and the second lamination hole 204/214), there can be at most two different corrugated channels. If the lamination holes were increased to four, there could be four different corrugated channels. That is, each lamination of the lamination stack 220 could be successively rotated 90 degrees from the adjacent lamination.

Figure 3:
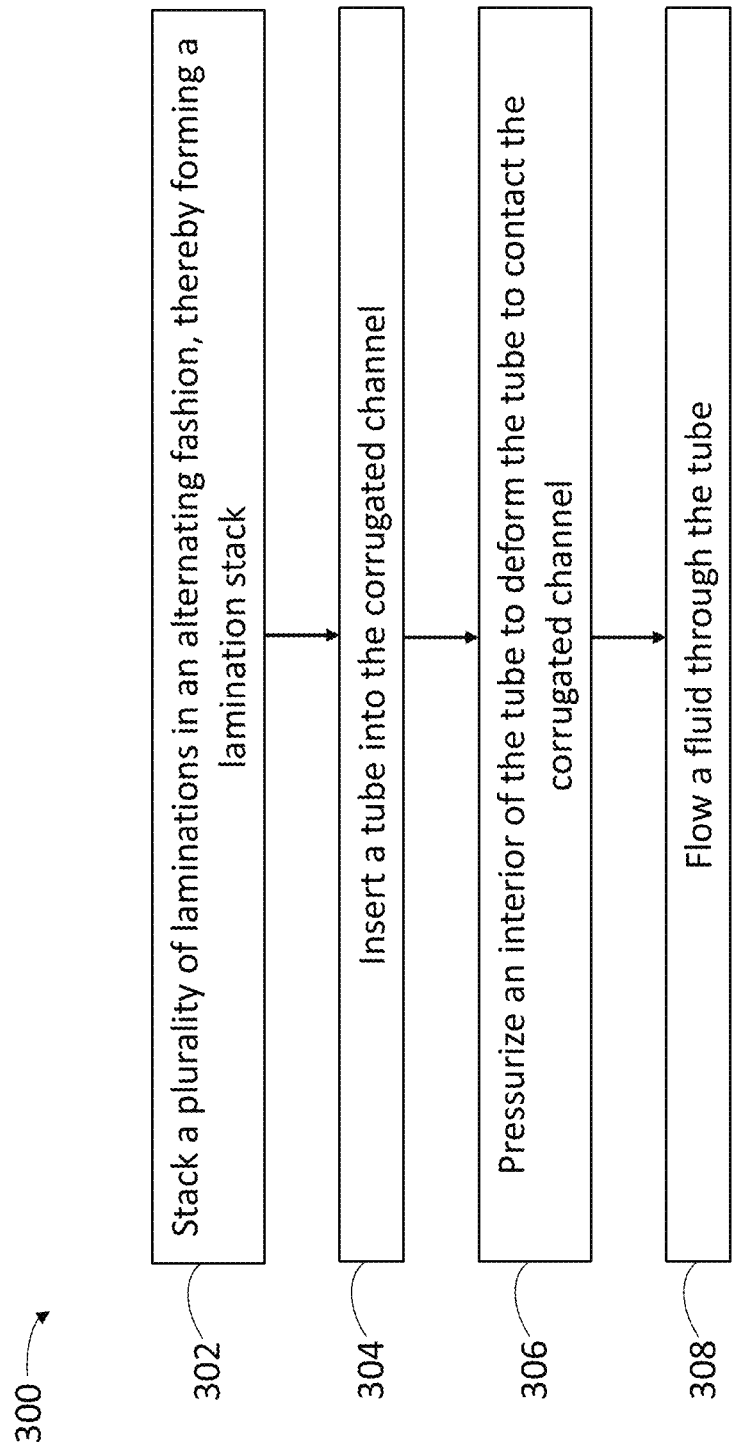
FIG. 3 is a flow diagram of a method, in accordance with some embodiments.

FIG. 3 is a flow diagram of a method 300, in accordance with some embodiments. Method 300 relates to a method of a cooling a stator. A stator according to any of the embodiments can be used in method 300. Step 302 includes stacking a plurality of laminations in an alternating fashion, thereby forming a lamination stack. Step 304 includes inserting a tube into the corrugated channel. Step 306 includes pressurizing an interior of the tube to deform the tube to contact the corrugated channel. Step 306 includes flowing a fluid through the tube. With method 300, the present disclosure takes advantage of hydraulic expansion of tubes, such as cooling tubes, into the stator back iron of a lamination stack, e.g., laminated frame motor. Upon insertion of the tubes, hydraulic pressure is applied inside of the tubes to close any potential air gap between the tube and lamination stack. As a result, the tube is plastically deformed and is conformed to the contour determined by the corrugated channel of the lamination stack. The lamination holes (for inserting the tube into the lamination) can be cut with different sizes. The laminations of the lamination stack are stacked in an alternating fashion to form a corrugated channel with an internal corrugated feature for the tube to deform into. Similarly, the stator end plates are designed such that the tube will deform inside a channel of the stator end plate. More cut-outs can be made in the stator end plate to increase a surface area of the channel to allow the cooling fluid to flow between cooling tubes inserted in different lamination holes. This design eliminates the need for a tube connection. This will also secure the laminations to one another, forming a lamination stack that does not need and/or require other means of fixing the lamination stack. This eliminates the need for additional holes in the laminations for bolts, rivets, welds, or other securement methods.

EXAMPLES

The flowing results for the prophetic example were obtained from a computational fluid dynamics (CFD) simulation (simulation analysis was done via modeling with Ansys Inc., Canonsburg, Pennsylvania, U.S.). Compared to tubes with no corrugated channel, the cooling performance of the tube can be improved by 38% at the same coolant flow rate. Equivalently, at the same cooling rate, the corrugated channel and the tube that is conformed thereto use 32% less flow and save 50% of pumping power. Compared to motors with no corrugated channel, the increased power or torque output from a comparable motor package with tubes were higher (e.g., 50% higher).

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

ASPECTS

Various Aspects are described below. It is to be understood that any one or more of the features recited in the following Aspect(s) can be combined with any one or more other Aspect(s).

Aspect 1. The stator, comprising: a lamination stack, wherein the lamination stack includes a plurality of laminations stacked upon each other, wherein each lamination of the plurality of laminations comprises: a first lamination hole with a first cross-sectional geometry, and a second lamination hole with a second cross-sectional geometry, wherein the first cross-sectional geometry differs from the second cross-sectional geometry, and wherein a corrugated channel of the lamination stack has varying internal diameter, the corrugated channel formed by the first lamination hole of a first lamination being axially aligned over the second lamination hole of a second lamination forming the corrugated channel.

Aspect 2. The stator of Aspect 1, wherein the corrugated channel has a varying diameter along an axial direction of the stator, thereby forming a corrugated internal feature of the corrugated channel.

Aspect 3. The stator of Aspect 1 or Aspect 2, wherein the corrugated internal feature increases a surface area of the corrugated channel for heat dissipation and increases turbulent flow for fluid flowing through the corrugated channel.

Aspect 4. The stator as in any of the preceding Aspects, wherein each lamination of the plurality of laminations comprises at least the first lamination hole, the second lamination hole, and a third lamination hole with a third cross-sectional geometry, and wherein a cross-sectional diameter of the first lamination hole, the second lamination hole, and the third lamination hole differ from each other.

Aspect 5. The stator as in any of the preceding Aspects, wherein the first lamination hole of a first lamination, the second lamination hole of a second lamination, and the third lamination hole of a third lamination are axially aligned with each other.

Aspect 6. The stator as in any of the preceding Aspects, wherein the lamination stack is adjacent to a stator end plate.

Aspect 7. The stator of Aspect 6, wherein the stator end plate comprises a channel that is directly connected to the corrugated channel.

Aspect 8. The stator as in any of the preceding Aspects, further comprising a tube inserted into the corrugated channel of the lamination stack.

Aspect 9. The stator of Aspect 8, wherein the tube comprises a coating on an exterior of the tube.

Aspect 10. The stator of Aspect 8, wherein an end connection of the tube is integrated into a stator end plate.

Aspect 11. A method of manufacturing a stator comprising: stacking a plurality of laminations to form a lamination stack, wherein each lamination of the plurality of laminations comprises: a first lamination hole with a first cross-sectional geometry, and a second lamination hole with a second cross-sectional geometry, wherein the first cross-sectional geometry differs from the second cross-sectional geometry, and wherein stacking the plurality of laminations comprises axially aligning the first lamination hole of a first lamination with the second lamination hole in alternating fashion, thereby forming a corrugated channel of the lamination stack with varying internal diameter.

Aspect 12. The method of Aspect 11, wherein each lamination further comprises a third lamination hole with a third cross-sectional geometry, and wherein the first cross-sectional geometry, the second cross-sectional geometry, and the third cross-sectional geometry differ from each other.

Aspect 13. The method of Aspect 12, wherein the first lamination hole of a first lamination, the second lamination hole of a second lamination, and the third lamination hole of a third lamination are axially aligned with each other.

Aspect 14. A method of cooling a stator, comprising: stacking a plurality of laminations in an alternating fashion, thereby forming a lamination stack, wherein each lamination of the lamination stack comprises: a first lamination hole with a first cross-sectional geometry, and a second lamination hole with a second cross-sectional geometry, wherein the first cross-sectional geometry differs from the second cross-sectional geometry, and wherein stacking the plurality of laminations in the alternating fashion, comprises axially aligning the first lamination hole of a first lamination over the second lamination hole of a second lamination, thereby forming a corrugated channel of the lamination stack; inserting a tube into the corrugated channel; pressurizing an interior of the tube to deform the tube to contact the corrugated channel, thereby creating a corrugated form of the tube; and flowing a fluid through a cooling tube, thereby cooling the stator.

Aspect 15. The method of Aspect 14, wherein pressurizing the interior of the tube comprises hydraulically expanding the tube.

Aspect 16. The method of Aspect 14 or 15, wherein flowing the fluid comprises non-laminar flow.

Aspect 17. The method as in any of the preceding Aspects, wherein deforming the tube comprises plastically deforming the tube against the corrugated channel.

Aspect 18. The method as in any of the preceding Aspects, wherein deforming the tube closes any gaps between an outer wall of the tube and the corrugated channel.

Aspect 19. The method as in any of the preceding Aspects, further comprising inserting the tube through the corrugated channel and into a stator end plate.

Aspect 20. The method of Aspect 19, wherein the corrugated form of the tube mechanically anchor the cooling tube to the lamination stack, thereby reducing or removing a need for additional anchor methods.

Aspect 21. The method of Aspect 19, wherein deforming the tube comprises deforming the tube inside of a channel of the stator end plate.

Aspect 22. The method as in any of the preceding Aspects, further comprising heating or cooling the stator before inserting the tube into the corrugated channel.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:
1. A stator, comprising:
 a lamination stack,
  wherein the lamination stack includes a plurality of laminations stacked upon each other, wherein each lamination of the plurality of laminations comprises:
    a first lamination hole with a first cross-sectional geometry, and
    a second lamination hole with a second cross-sectional geometry,
        wherein the first cross-sectional geometry differs from the second cross-sectional geometry,
wherein a corrugated channel of the lamination stack has varying internal diameter, the corrugated channel formed by the first lamination hole of a first lamination being axially aligned over the second lamination hole of a second lamination forming the corrugated channel,
wherein fluid flows through the corrugated channel, and
wherein the lamination stack is adjacent to a stator end plate,
wherein the stator end plate comprises a corrugated channel that is directly connected to the corrugated channel of the lamination stack.

2. The stator of claim 1,
wherein the corrugated channel has a varying diameter along an axial direction of the stator, thereby forming a corrugated internal feature of the corrugated channel.

3. The stator of claim 2,
wherein the corrugated internal feature increases a surface area of the corrugated channel for heat dissipation and increases turbulent flow for fluid flowing through the corrugated channel.

4. The stator of claim 1,
further comprising a tube inserted into the corrugated channel of the lamination stack.

5. The stator of claim 4,
wherein the tube comprises a coating on an exterior of the tube.

6. The stator of claim 4,
wherein an end connection of the tube is integrated into a stator end plate.

7. A method of manufacturing a stator comprising:
stacking a plurality of laminations to form a lamination stack,
    wherein each lamination of the plurality of laminations comprises:
        a first lamination hole with a first cross-sectional geometry, and
        a second lamination hole with a second cross-sectional geometry,
            wherein the first cross-sectional geometry differs from the second cross-sectional geometry,
    wherein stacking the plurality of laminations comprises axially aligning the first lamination hole of a first lamination with the second lamination hole in alternating fashion, thereby forming a corrugated channel of the lamination stack with varying internal diameter,
    wherein fluid flows through the corrugated channel, and
    wherein the lamination stack is adjacent to a stator end plate,
        wherein the stator end plate comprises a corrugated channel that is directly connected to the corrugated channel of the lamination stack.

8. A method of cooling a stator, comprising:
stacking a plurality of laminations in an alternating fashion, thereby forming a lamination stack,
    wherein each lamination of the lamination stack comprises:
        a first lamination hole with a first cross-sectional geometry, and
        a second lamination hole with a second cross-sectional geometry,
            wherein the first cross-sectional geometry differs from the second cross-sectional geometry, and
    wherein stacking the plurality of laminations in the alternating fashion, comprises axially aligning the first lamination hole of a first lamination over the second lamination hole of a second lamination, thereby forming a corrugated channel of the lamination stack;
inserting a tube into the corrugated channel;
pressurizing an interior of the tube to deform the tube to contact the corrugated channel, thereby creating a corrugated form of the tube; and
flowing a fluid through a cooling tube, thereby cooling the stator,
    wherein the fluid flows through the corrugated channel; and
    wherein the lamination stack is adjacent to a stator end plate,
    wherein the stator end plate comprises a corrugated channel that is directly connected to the corrugated channel of the lamination stack.

9. The method of claim 8,
wherein pressurizing the interior of the tube comprises hydraulically expanding the tube.

10. The method of claim 8,
wherein flowing the fluid comprises non-laminar flow.

11. The method of claim 8,
wherein deforming the tube comprises plastically deforming the tube against the corrugated channel.

12. The method of claim 8,
wherein deforming the tube closes any gaps between an outer wall of the tube and the corrugated channel.

13. The method of claim 8,
further comprising inserting the tube through the corrugated channel and into the stator end plate.

14. The method of claim 13,
wherein the corrugated form of the tube mechanically anchor the cooling tube to the lamination stack, thereby reducing or removing a need for additional anchor methods.

15. The method of claim 13,
wherein deforming the tube comprises deforming the tube inside of a channel of the stator end plate.

16. The method of claim 8,
further comprising heating or cooling the tube before inserting the tube into the corrugated channel.

17. The method of claim 8,
further comprising heating or cooling the stator before inserting the tube into the corrugated channel.

* * * * *